(12) United States Patent
AL-Shaibani et al.

(10) Patent No.: US 10,791,869 B2
(45) Date of Patent: Oct. 6, 2020

(54) SYSTEM AND METHOD FOR AUTOMATED COFFEE GRIND REFINEMENT

(71) Applicant: Auroma Brewing Company, Wilmington, DE (US)

(72) Inventors: Rayan AL-Shaibani, Vancouver (CA); Pawin Wongtada, Shenzhen (CN); Ornicha Srimokla, Shenzhen (CN)

(73) Assignee: Auroma Brewing Company, Wilmington, DE (US)

( * ) Notice: Subject to any disclaimer, the term of this patent is extended or adjusted under 35 U.S.C. 154(b) by 313 days.

(21) Appl. No.: 15/689,241

(22) Filed: Aug. 29, 2017

(65) Prior Publication Data
US 2018/0055289 A1 Mar. 1, 2018

Related U.S. Application Data

(60) Provisional application No. 62/380,928, filed on Aug. 29, 2016.

(51) Int. Cl.
*A47J 31/42* (2006.01)
*B07B 1/40* (2006.01)
*B01D 33/03* (2006.01)
*B02C 19/16* (2006.01)
*B01D 33/00* (2006.01)

(52) U.S. Cl.
CPC ............. *A47J 31/42* (2013.01); *B01D 33/03* (2013.01); *B02C 19/16* (2013.01); *B07B 1/40* (2013.01); *B01D 33/008* (2013.01)

(58) Field of Classification Search
CPC . A47J 31/42; B07B 1/282; B07B 1/40; B01D 33/008; B01D 33/03; B02C 7/18; B02C 7/02; B02C 7/10; B02C 4/02

USPC .......... 99/286; 210/384, 388, 173, 174, 266; 241/68, 69, 261.2, 236, 235, 78, 79; 209/315, 326, 365.1, 365.3

See application file for complete search history.

(56) References Cited

U.S. PATENT DOCUMENTS

| | | | |
|---|---|---|---|
| 1,039,854 A | 10/1912 | Wear | |
| 1,069,064 A | 7/1913 | Holton | |
| 2,045,591 A | 6/1936 | Falia | |
| 2,202,936 A * | 6/1940 | Williams | A47J 42/38 241/276 |

(Continued)

OTHER PUBLICATIONS

YouTube, "Making Coffee With the RAFINO" (online) (retrieved from the internet on Jan. 12, 2017), Mar. 23, 2016 (Mar. 28, 2016); entire document, especially p. 3, Fig 1; p. 5, Fig. 1; p. 1, Fig. 1; p. 6, Fig 1; 1:45-2:00; 2:00-2:30.

(Continued)

*Primary Examiner* — Reginald Alexander
(74) *Attorney, Agent, or Firm* — Alpine Patents LLC; Brian Van Osdol (57) ABSTRACT

A system and method for coffee bean processing that includes a bean refinement chute with a bean grind inlet and a refined grind outlet; a filter system integrated into at least one surface within the chute; a vibration system operable in an active state that agitates bean grinds during progression from the bean grind inlet to the refined grind outlet; a refined grind chamber positioned adjacent to the refined grind outlet and thereby collects refined grinds; and a filtered grind chamber positioned beneath the filter system and thereby collects filtered grinds.

20 Claims, 8 Drawing Sheets

(56) References Cited

U.S. PATENT DOCUMENTS

| | | | | |
|---|---|---|---|---|
| 3,204,764 A | * | 9/1965 | Prins | B03B 5/04 |
| | | | | 209/18 |
| 3,610,540 A | * | 10/1971 | Krolopp | A47J 42/44 |
| | | | | 241/2 |
| 3,964,175 A | | 6/1976 | Sivetz | |
| 4,046,694 A | * | 9/1977 | Ellis | B01D 35/20 |
| | | | | 210/297 |
| 4,605,175 A | | 8/1986 | Weber | |
| 5,341,939 A | | 8/1994 | Aitchison et al. | |
| 5,417,145 A | * | 5/1995 | Joseph, Jr. | A47J 31/42 |
| | | | | 241/33 |
| 5,463,934 A | | 11/1995 | Locati | |
| 5,615,601 A | | 4/1997 | Eugstar | |
| 5,845,561 A | | 12/1998 | Chigira et al. | |
| 6,988,444 B1 | | 1/2006 | Pfeifer et al. | |
| 8,495,950 B2 | | 7/2013 | Fedele et al. | |
| 8,826,803 B2 | | 9/2014 | Mazzer | |
| 2001/0004973 A1 | * | 6/2001 | Asakawa | A01C 3/00 |
| | | | | 209/326 |
| 2005/0242009 A1 | * | 11/2005 | Padalino | B01D 33/0376 |
| | | | | 210/86 |
| 2007/0187534 A1 | | 8/2007 | Anson | |
| 2008/0017042 A1 | | 1/2008 | Almblad et al. | |
| 2011/0212229 A1 | | 9/2011 | McLaughlin et al. | |
| 2015/0201796 A1 | | 7/2015 | Kuempel et al. | |
| 2017/0119195 A1 | | 5/2017 | AL-Shaibani et al. | |

OTHER PUBLICATIONS

YouTube, "Rafino" (online) (retrieved from the internet on Jan. 12, 2017) , Mar. 28, 2016 (Mar. 28, 2016); entire document.

\* cited by examiner

SYSTEM AND METHOD FOR AUTOMATED COFFEE GRIND REFINEMENT

CROSS-REFERENCE TO RELATED APPLICATIONS

This Application claims the benefit of U.S. Provisional Application No. 62/380,928, filed on 29 Aug. 2016, which is incorporated in its entirety by this reference.

TECHNICAL FIELD

This invention relates generally to the field of coffee grinders, and more specifically to a new and useful system and method for automated coffee grind refinement.

BACKGROUND

There are numerous variables when it comes to making coffee. One key aspect of good coffee is the coffee grind. Having the correct grind size can have a large impact on the coffee extraction during a brewing process. The same brew process conducted on different grind sizes results in different amounts of dissolved coffee in the resulting drink. Smaller grind sizes result in more dissolved coffee, while larger grind sizes result in less dissolved coffee. As one problem, over dissolved coffee can cause unpleasant chemicals to be released by the grinds, and under dissolved coffee can result in weak taste. Obtaining the proper grind is one challenge of making coffee. At the same time coffee is preferred by many to be ground near the time of brewing and so the grinding process is performed on site.

Blade grinders are one type of budget coffee grinders but they offer little control or consistency of the grind size of a coffee. Higher end grinders are usually burr grinders, and they can provide better control over the produced grind size, but even burr grinders generate a wide variety of grind sizes. The current coffee grinding solutions fail to provide high quality coffee grounds. Thus, there is a need in the coffee field to create a new and useful system and method for automated coffee grind refinement. This invention provides such a new and useful system and method.

DESCRIPTION OF THE EMBODIMENTS

The following description of the embodiments of the invention is not intended to limit the invention to these embodiments but rather to enable a person skilled in the art to make and use this invention.

1. Overview

A system and method for automated coffee grind refinement functions to filter coffee grinds to isolate at least one group of coffee grinds with enhanced consistency of grind size properties. The system and method preferably transform a source coffee bean product to refined grinds. The system and method can additionally produce filtered grinds. The refined grinds are preferably used in a brewing process. The filtered grinds may be used for other coffee processes (e.g., used in cold brew, etc.), thrown away, undergo a secondary refinement process, and/or used in any suitable way. The system and method preferably applies agitation of coffee grinds as they progress along a filter. This, as a result, separates coffee grinds based on size.

As determined in the development of the system, the elimination of smaller grind particles from a grind distribution may be beneficial to the resulting brewed coffee. The system is preferably designed to filter out smaller grind particles (i.e., "fines" or "the unrefined grind") from larger grind particles (i.e., "the refined grind"). The system may alternatively be used to target larger grinds or particular grind size ranges.

As a first potential benefit, the system produces a higher quality coffee ground consistency. A source of coffee grinds can be produced from a coffee grinder. This source will have a range of coffee grind sizes. Even with a high-end burr coffee grinder there can be a range of grind size that can influence brewing consistency. The system and method can preferably enhance the consistency of coffee grinds by processing and filtering coffee grind pieces by size. In some variations, this may be used to produce superior higher quality coffee grinds when coupled with high quality coffee grinders. In other variations, the coffee grind refinement process may be a design alternative to costly coffee grinder mechanisms. For example, a blade coffee grinder may be used in connection with the system and method as an alternative grinding approach to a burr grinder.

As another potential benefit, the system can accommodate the tradeoff between the consistency of the refined grind and the yield from a given input. Higher consistency in the refined grind generally generates waste. The system preferably accounts for such a tradeoff and in some cases can dynamically alter the refinement approach. The system and method can have operating modes that can enable a balance between processing time, grind yield, grind waste, and/or consistency. The system and method may additionally enable adjusting of the balance of the various targets.

As yet another potential benefit, dynamic control of the refinement process can enable the system to accommodate different targeted grind sizes.

The system is preferably used in producing coffee grinds used in making coffee but can be used in grinds usable for a variety of coffee type drinks such as drip, pour over, French press, espresso, and/or other types of coffee drinks. The system could similarly be applied to other culinary grinding processes that, for example, benefit from consistent grind size. Herein, the system and method is predominantly described using the exemplary application of coffee making, but one skilled in the art can appreciate that the system and method can be applied to other applications and is not limited to coffee making.

The system and method can be applied to a variety of form factors. In one exemplary implementation, the system and method is used within an integrated coffee maker where the refined beans are subsequently brewed. In another exemplary implementation, the system and method are integrated with a coffee grinder system. In another exemplary implementation, the system and method could be a stand-alone system or one that can attach and be used with a coffee maker and/or coffee grinder. The system and method may be designed for personal use and/or professional use.

2. System for Automated Coffee Grind Refinement

Figure 1:
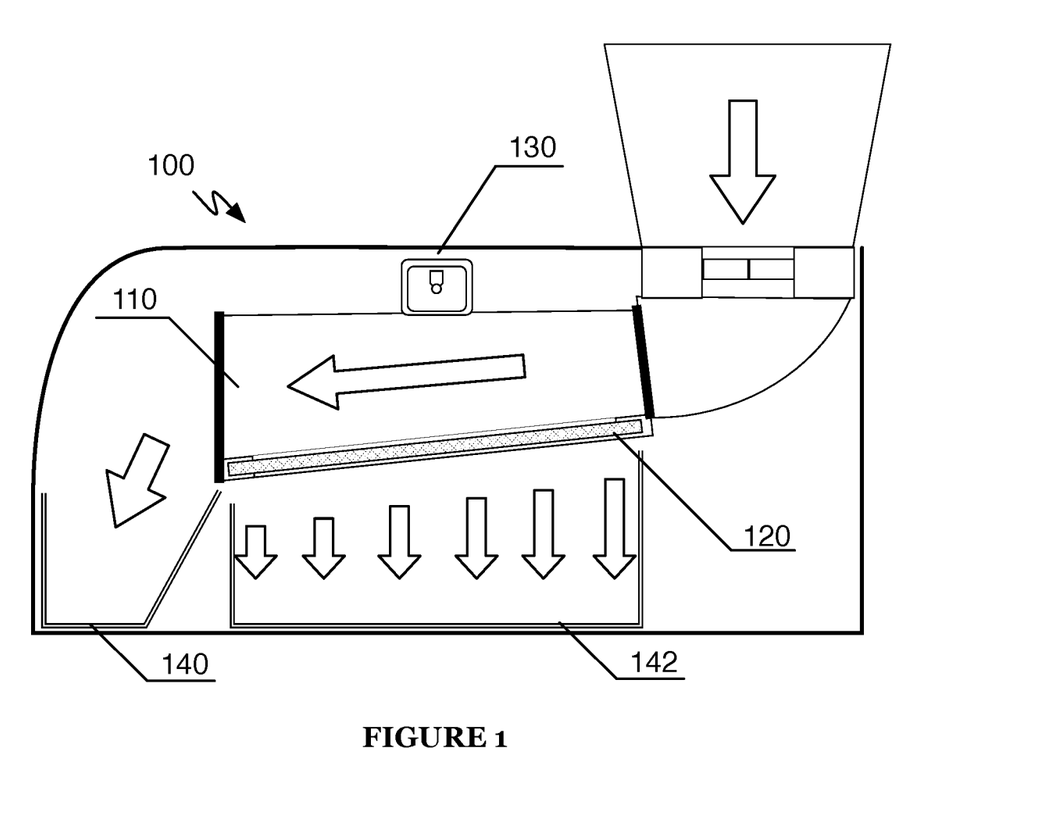
FIGS. 1 and 2 are schematic representations of variations of system of preferred embodiments.

As shown in FIG. 1, a system for automated coffee grind refinement of a preferred embodiment includes a vibrational refinement system 100 with a bean refinement chute 110, a filter system 120, and a vibration system 130. The vibrational refinement system 100 can additionally include at least two chambers for filtered and unfiltered grinds. Preferably these include a refined grind chamber 140 and a filtered grind chamber 142. The system preferably operates by moving grinds across a filter using vibration, gravity, airflow, and/or momentum from the grinder. The system preferably accepts whole beans or a coffee grind input and segments the grind particles into at least one set of refined grinds and at least one set of filtered grinds.

Figure 2:
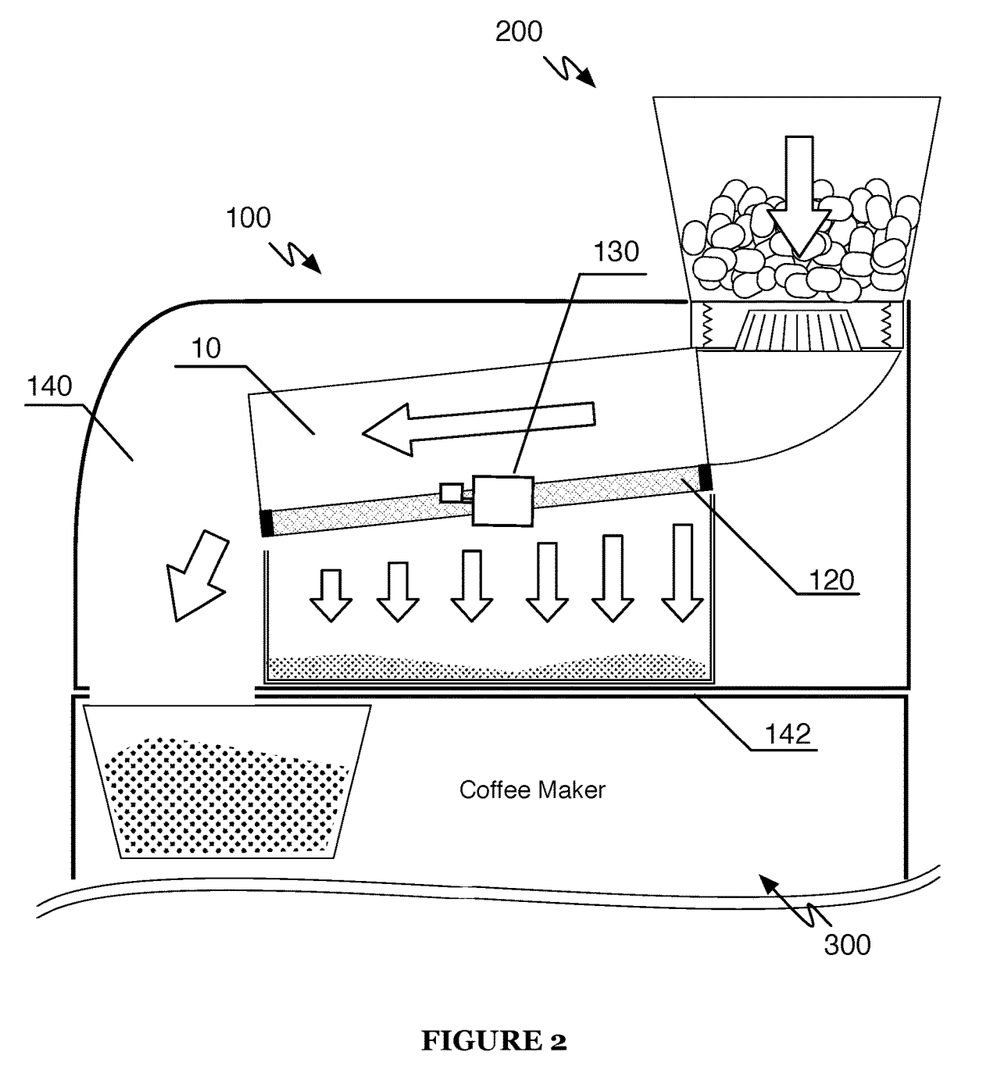

The system functions to integrate a shaker filter system into an automated coffee grinder. The system may be implemented in a variety of form factors. In one variation, the system may additionally include a grinding system 200 as shown in FIG. 2. For example, the system could be used in a standalone grinder for personal or professional use. The vibrational refinement system 100 may alternatively be used in combination with an outside bean grinder or with pre-ground beans. The system could alternatively be used in an integrated brewing system that brews coffee from the refined grinds, in which case the system may include a coffee brewing system 300. Similarly, the system may include attachment mechanisms to facilitate rigidly or positionally integrating with an outside coffee grinder and/or coffee maker. The system could be offered as an at home consumer electronic product. The system may alternatively be a culinary tool used by professionals or connoisseurs of coffee. In a grinder integrated variation, the grinding system 200 of a preferred embodiment functions to produce a coffee grind input for the vibrational refinement system 100. The grinding system 200 preferably includes a bean hopper, a grinding element, and a bean grind outlet. Coffee beans are preferably deposited and held in the bean hopper until being grounded by the grinding element. The resulting coffee grinds are then dispensed out of the bean grind outlet. The grinding element is preferably a burr grinder, but may alternatively be a blade grinder or any suitable type of grinder. The coffee grinds that are dispensed from the coffee grinder are preferably unprocessed grinds, in that they have not been filtered. As discussed, alternative implementations may enable unprocessed (or partially processed) grinds to be deposited and processed by the vibrational refinement system 100. In some variations, the grinding system 200 may be electrically controlled in coordination with the vibrational refinement system 100. Coordinated control may be used in targeting a quantity of refined grinds, controlling the inbound flow of unprocessed grinds, and/or for other suitable reasons. A coffee grinder may have controllable grinding state (e.g., on/off), grinding rate, grinding size, and/or other settings that can be adjusted when coordinating activation of the bean grinder.

In a coffee brewer integrated variation, the coffee brewing system 300 functions to brew coffee grinds to make some form of a coffee-based drink. Preferably, an integrated coffee brewing system 300 is configured such that the refined grind chamber deposits refined grinds into a brew chamber of the coffee brewing system as shown in FIG. 2. The coffee brewing system 300 may support various forms of coffee brewing techniques and mechanisms.

In some alternative variations, the system may be offered as a vibrational refinement system without the grinding system 200 and/or coffee brewing system 300. The vibrational refinement system 100 can be adapted to be used as an add-on to an existing grinding system or as a secondary grinding process after an initial stage of grinding is complete. In one implementation, the system can include a grinder attachment configured to fixture the vibrational refinement system 100 to an external grinding system and/or a brewer attachment configured to fixture the vibrational refinement system 100 to an external coffee brewing system. A grinder attachment is preferably configured such that a bean grind inlet of the vibrational refinement system 100 is positioned so as to receive bean grinds from the bean grinder. This preferably involves the bean grind inlet being positioned beneath a bean grind outlet of the grinding system. Similarly, the vibrational refinement system 100 may include a grind hopper used to hold ground coffee before being refined. In this variation, a user will use any suitable system for grinding coffee beans and then deposit the resulting coffee grinds into the grind hopper. The grind hopper can then facilitate depositing grinds into the vibrational refinement system 100 when the refinement process is started.

The vibrational refinement system 100 of a preferred embodiment functions to transform coffee grinds with an initial grind size consistency into refined coffee grinds with a resulting improved grind size consistency. The resulting grind size consistency is preferably greater than the initial grind size consistency (i.e., less variation in individual grind size). The vibrational refinement system 100 preferably includes the bean refinement chute 100 through which the grinds progress. The grinds progress through the chute 100 from gravity, vibrational agitation, or other forces (e.g., a fan, rotational agitation). The chute 110 preferably includes a filter used in separating the grinds. As the grinds progress through the chute 110, smaller grinds (targeted by the filter mesh size) are filtered (i.e., fall through the filter) and physically separated from other grinds. The grinds are preferably agitated by the vibration system 130 so that the grinds are more uniformly filtered. The vibrational refinement system 100 can additionally include a refined grind chamber 140 positioned adjacent to the refined grind outlet so as to collect refined grinds and a filtered grind chamber 142 positioned beneath the filter system so as to collect filtered grinds. Here the labels of refined and filtered are used as general descriptors. In some cases, the desired grinds may be the grinds that were filtered.

Figure 3:
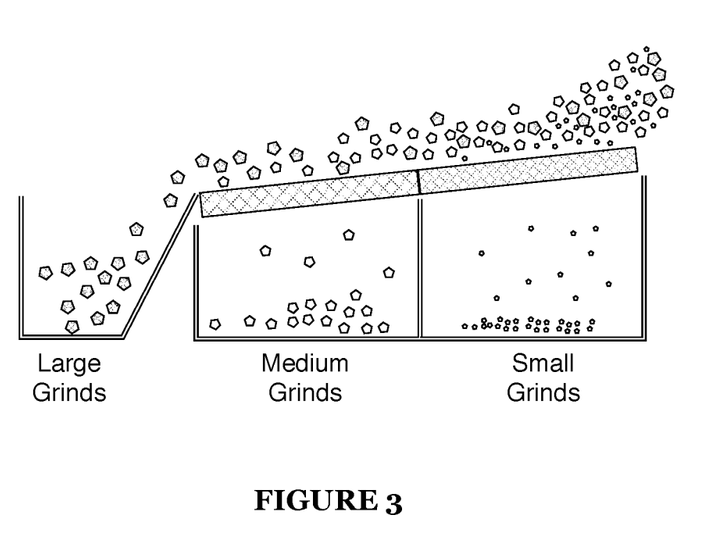
FIGS. 3 and 4 are schematic representations of multi-stage variations of a preferred embodiment.
Figure 4:
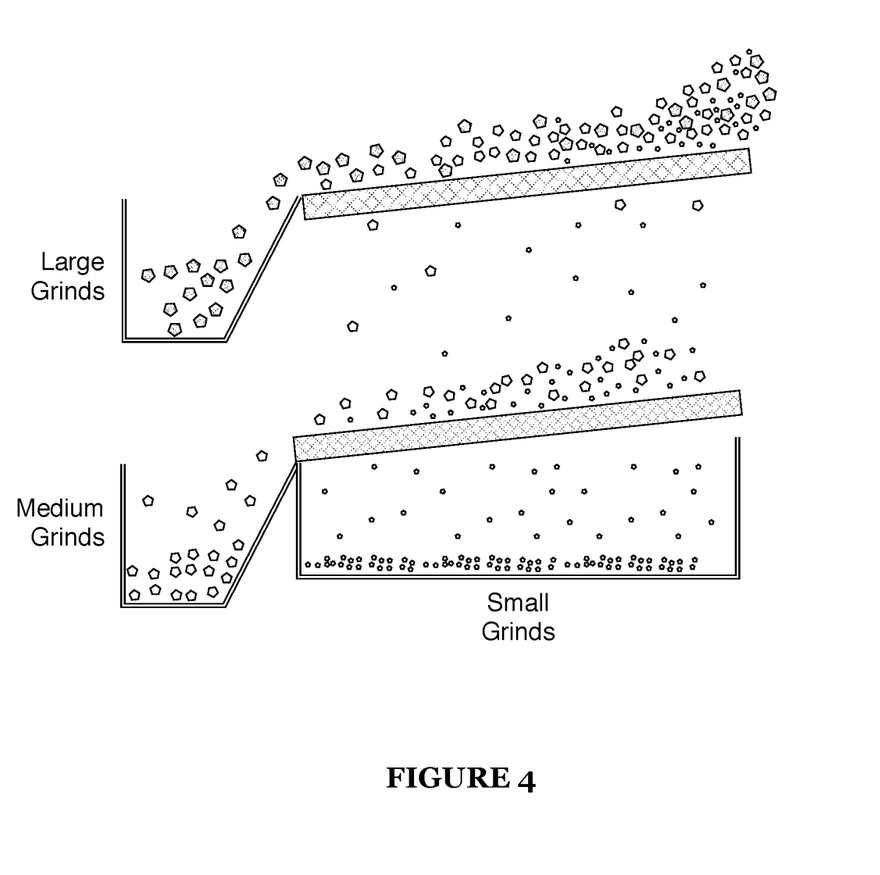

The vibrational refinement system 100 is preferably a single stage refinement process. A single stage refinement process will preferably only segment two classes of grinds. However, a multistage vibrational refinement system 100 may include multiple refinement stages that are applied to the refined and/or filtered grinds. Multistage vibrational refinement can function to reduce waste by segmenting the original inconsistent grinds into at least two size classes of grinds as shown in FIGS. 3 and 4. A multistage variation will preferably include multiple refined grind chambers and/or filtered grind chambers. In some variations the preferred refined grinds could be any one or more of the filtered and/or unfiltered grind chambers. Herein, the system is primarily described as a single stage system, but one knowledgeable in the art would appreciate that various aspects of a single stage system may similarly be applied to a multistage vibrational refinement process.

The bean refinement chute 110 functions as a channel through which grinds flow as they are refined from an initial state. The chute 110 is preferably a container with an internal chamber. The chute 110 is preferably a linear channel that has a bean grind inlet and a refined grind outlet. Unprocessed grinds are preferably received through the bean grind inlet, and unfiltered grinds are delivered out the refined grind outlet. The refined grind outlet is more generally characterized as a processed grind outlet, if, for example, the refined grinds are considered grinds that have passed through the filter (i.e., filtered grinds). The length of the chute 110 is preferably selected such that it is sufficiently long to allow sufficient filtering of the grinds and short enough to mitigate the opportunity of adverse changes to the grinds such as heating and/or vibration-induced "grinding". The chute 110 may alternatively be any suitable shape such as a curve, a funnel, and/or any suitable shape.

The chute 110 preferably has the filter system exposed along at least the bottom surface of the chute 110. The chute 110 and more specifically the top surface of the filter system 120 have a downward surface slope from the bean grind inlet to the refined grind outlet. A downward surface slope is characterized as being non-horizontal with a slight angle off of the horizontal axis. The horizontal axis here refers to an axis perpendicular to the direction of gravity. The angle of the slope can be set based on the desired role of gravity in progressing grinds through the chute 110. In some variations, the chute 110 and/or filter system 120 may be horizontal if vibration or other forces are used to promote progress towards the exit of the chute 110.

Figure 5:
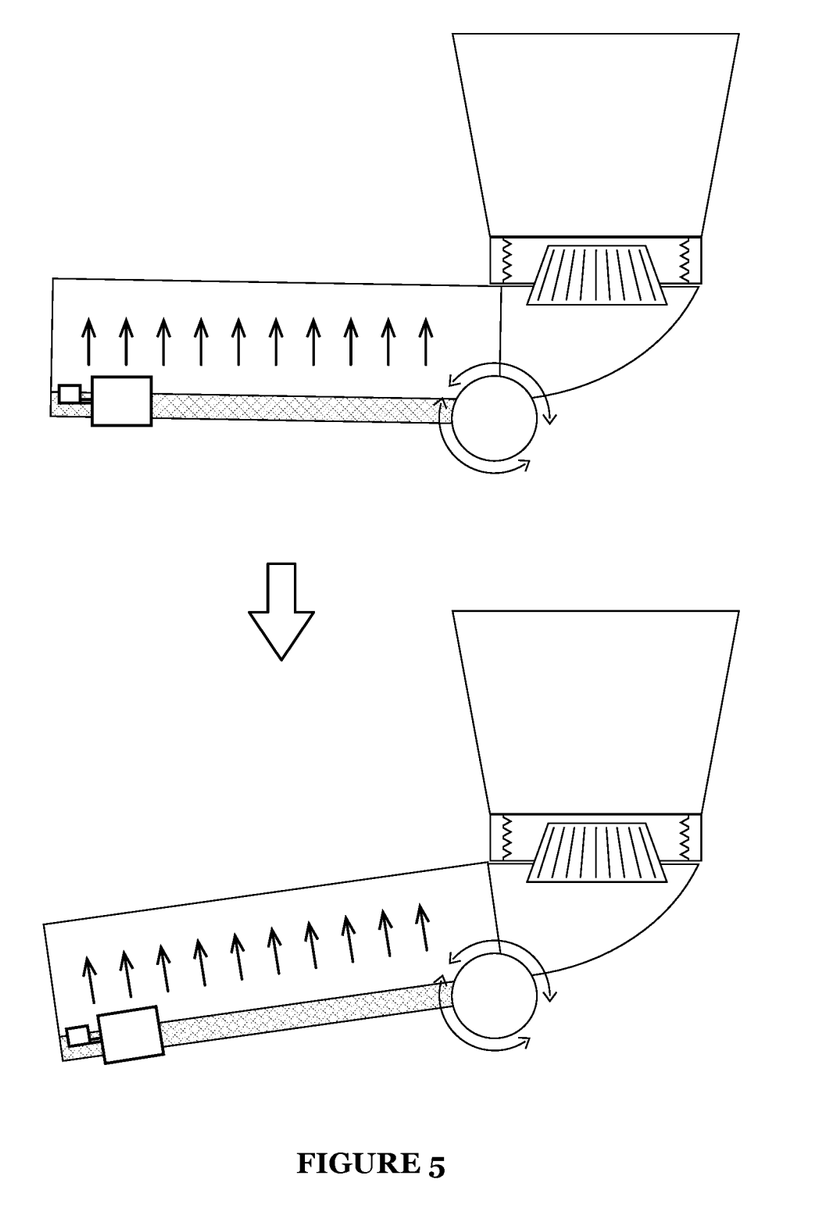
FIG. 5 is a schematic representation of an adjustable chute variation.

In some variations, the angle of the chute 110 and/or filter system 120 can be variable as shown in FIG. 5. The angle may be automatically controlled via an actuator or manually set by a user. Accordingly, the chute 110 and/or the filter system 120 may include a slope actuator. The slope actuator can be a motor controlled pivot point that can adjust the slope. The slope actuator may alternative be an actuation of the height of the inlet or outlet of the chute 110. In one variation, the slope can be variably set within some range of slope angles. In another variation, the stabled angles of the slope actuator may be discrete enabling at least two different slope states. The slope can be adjusted to augment the progress of the grinds within the chute 110.

In one alternative implementation, the chute 110 may be implemented more as a bowl or chamber that has only a bean grind inlet. This variation may not depend on progression of the grinds across the filter, but instead processes them in place within such a processing chamber. After processing, the unfiltered grinds can be extracted from the chute 110 while the filtered grinds are deposited in a filtered grind chamber.

The filter system 120 functions as a physical mechanism for sifting grinds and separating them based on their size. The filter system 120 preferably includes a filter element that can be a sieve, mesh, or other suitable form of a filter with defined granular through-holes across the surface of the filter element. Objects of sufficiently small size can pass through the filter system 120 while granular materials larger than the holes do not transfer through the filter system 120. The filter element is preferably a metal wire mesh or chemically etched sheet metal but may alternatively be any suitable type of filter made of any suitable type of material.

The filter system 120 is preferably integrated into at least one surface of the chute and more specifically is integrated into a bottom surface of the chute 110. The grinds preferably bounce across or otherwise encounter the filter system 120 as they progress through the chute 110. Grinds of a sufficiently small size pass through the filter system 120, leaving a more consistent grind to be deposited out of the end of the chute 110. The filter system 120 is preferably flexibly mounted within the coffee bean processing system so as to allow for movement of the filter system in response to agitation by the vibration system 130.

In one variation, the full surface of the chute 110 may be a filter. In this variation, the chute 110 and the filter system 120 may be fully integrated such that the surface and design of the chute 110 also serves to filter grinds. For example, a cylindrical filter system 120 may be used as the chute 110. In the cylindrical filter variation, rotation of the filter system 120 may be used in addition to or as an alternative to vibrational agitation. The filter system 120 may alternatively be integrated in other configurations where the filter system 120 may cover multiple distinct sub-regions of the chute 110 and/or various proportions of the chute 110 surface.

The filter system 120 preferably has defined holes that target a particular minimum grind-size threshold. In a preferred implementation, the filter system 120 is a single stage filter with a single filter size to target grinds with size properties below a targeted minimum grind size. The filter uses this grind size through-hole across the surface of the filter. As a result, the filtered grinds will primarily consist of grinds with a grind size below the targeted minimum grind size, and the unfiltered grinds (e.g., the refined grinds) will primarily be sized no smaller than the targeted minimum grind size. In some cases, the degree of filtering, which translates to the measure of consistency, may depend on various operating properties. In some operating states, processing time may target a particular amount of time for user-convenience and to avoid unintended heating of the grinds. With limited time, the degree of filtering may not fully filter all the grinds. The level of uniformity may, in some implementations, be implemented as a controllable variable that can be adjusted.

In one variation, the filter system 120 may have a variable filter. In a variable filter variation, the filter system 120 can include at least two filter stages with a first filter stage with a first mesh filter size and a second filter stage with a second mesh filter size. The first and second mesh filter sizes are preferably not the same. The different filter stages are additionally preferably encountered in different, distinct regions.

In another variation, a variable filter system will be a multi-stage filter system. A multi-stage filter system can be implemented in sequential filter staging and/or stacked filter staging. Sequential and stacked filtering configures can be used independently or in combination.

In a sequential filter staging variation a multi-stage filter may be used to filter different sized particles at different portions along the chute 110 as shown in FIG. 3. In particular, a second filter stage is sequentially positioned after the first filter stage. In this implementation, the filtered grind chamber can be positioned beneath the first filter stage of the filter system and a second filtered grind chamber can be positioned beneath the second filter stage. Grinds that are unfiltered at a first stage may then be filtered at the second stage in the sequential filter staging variation. The first filter stage may filter a first size range of grinds, the second filter stage may filter a second size range of grinds, and the unfiltered grinds will then be a third size range of grinds. In one implementation, the first size range is less than the second size range, which is less than the third size range. This implementation may be used to bandpass filter the grinds into three chambers as shown in FIG. 3. This implementation may alternatively be used to adjust filtering progression so grinds are filtered in a targeted order.

In a stacked filter staging variation, a multi-stage filter may be used so that a first filter stage initially filters grinds, and the grinds that pass through the first stage can then be processed by a second filter element. In this implementation, a second filter stage can be positioned beneath the first filter stage and configured to apply a second filtering of the grinds that are filtered out of the first stage. A refined grind chamber in this implementation may include a first refined grind chamber positioned adjacent to an outlet of the first filter stage and a second refined grind chamber positioned adjacent to an outlet of the second filter stage. In this configuration, grinds that are filtered in a first stage are then subsequently filtered out or left unfiltered in a second stage. Generally, the two filter stages are vertically stacked so that the filtered grinds of the first falls to the second filter stage. A stacked filter staging variation can similarly be used in bandpass filtering grinds. A first filter stage can leave grinds above a first level and filter out a grinds sized below the first level. Then a second filter stage can leave grinds above a second level and filter out grinds sized below the second level. As a result, a first collection of grinds will be not have passed through either filter, a second collection of grinds will have been passed through the first stage but not the second stage, and a third collection of grinds will have passed through the first and second stage. This will correspond to the largest, medium, and smallest grinds sizes respectively as shown in FIG. 4.

In a second variation, multi-stage filters may alternatively be used to achieve different filtering profiles during the processing. A mixture of different filter through-holes may be used in a filter element. The mixture of through-hole size and shape may be uniform or non-uniform across the surface of the filter element. A gradient of filter hole sizes may be used to filter particular sizes while also mitigating waste and clogging of the system. For example, a varied filtering profile may initially filter smaller grinds and then gradually increasing filtering size nearing the outlet.

The filter system 120 can be a substantially fixed mechanism of the system, wherein the filter element is not changeable without some level of disassembly. Alternatively, the filter element may be easily removable. For example, the filter system 120 could be implemented as a filter cartridge that can be removably inserted into the system. The filter cartridge could be removed for cleaning, for inserting a different size, or for disposing of the filter. In a cartridge variation, the filter system may include a filter slot and at least one filter cartridge as shown in FIG. 1. A filter slot is preferably a defined cavity. The filter slot will preferably include some mechanism elements to facilitate temporarily fixing a filter cartridge in place such as a snap locking mechanism. A filter cartridge preferably includes a filter element. Removal of the filter element can facilitate easier cleaning and/or replacement of the filter element. The system may additionally include a set of different of filter cartridges that can be selectively used depending on the desired grind process. For example, grinding coffee beans for one type of brewing method may use a first type of filter cartridge while a second type of brewing method may use a different type of filter cartridge. A filter cartridge may additionally include multiple filter stages. Alternatively, a multi-stage filter system may include multiple sets of filter slots and filter cartridges.

The vibration system 130 functions to agitate the coffee grinds as they pass through the chute 110. More generally, the vibration system 130 is an agitation system that promotes exposing the various grind particles to the surface of the filter system 120 as the source coffee grinds progress through the chute 110. The vibration system 130 is preferably operable in at least one active state configured to agitate the bean grinds during progression from the bean grind inlet to the refined grind outlet. The agitation gives sufficient opportunity for grinds to contact the filter and to be filtered if appropriate. Agitation is preferably a form of vibration but may alternatively include forms of rotation, shaking, rocking, or other suitable motions. In yet other variations, the system can operate by relying on gravity, fanning (e.g., air flow), grind momentum out of the grinder, and/or other sources of motion to promote movement of grinds from the inlet to the outlet.

The vibration system 130 preferably includes a vibrator motor such as a DC motor with an off-centered weight attached to the shaft. Other suitable vibrational mechanisms may alternatively be used. The vibration system 130 can provide a force vector perpendicular to the filter such that grinds are agitated so that the grinds are mixed. During vibration, smaller grinds will preferably be sifted towards the bottom so that they can be filtered out of the unfiltered grinds. The filter system 120 and/or chute is preferably mounted such that the vibration system 130 properly agitate the grinds. The vibrational motor is preferably coupled to a flexibly mounted filter system 120. The filter system 120 is preferably flexibly mounted within the coffee bean processing system. This filter system 120 can be directly flexibly mounted (e.g., the filter system 120 is the main component that is agitated) or indirectly flexibly mounted (e.g., the filter system 120 along with the other components such as the chute 110 may be flexibly mounted and agitated together). In one implementation, this may include the filter system 120 being flexibly mounted to the chute 110 as shown in FIG. 2. The filter system 120 may be mounted using springs, a flexible membrane or structure, a hinge, or any suitable mechanism. Similarly, the filter system 120 or a portion of the filter system 120 may be a flexible surface. Alternatively, the chute 110, the whole system, or any suitable subcomponent may provide flexibility to be vibrated. For example, the filter system 120 may be rigidly mounted to the chute 110, and the chute 110 may be flexibly mounted within the whole system, such that the filter system 120 is indirectly flexibly mounted through the flexible coupling of the chute 110 as shown in FIG. 1.

The vibration system 130 preferably uses a single vibrator motor but may alternatively use a set of vibrator motors or other agitation mechanisms. Each element of the vibrator system can be mounted at particular locations to offer uniform agitation, agitation control, or other vibrational properties. In one variation, filter stages may provide the same filter element, but can be configured so that distinct agitation stages can agitate the coffee grinds in different ways. For example, three vibrational motors may be mounted to three substantially vibrationally decoupled filter elements. The agitation magnitude can be set to distinct levels for the three stages.

A vibrational refinement system 100 preferably has some force that at least partially progresses the grind particles from an entrance to an exit. Gravity, airflow, momentum, agitation trajectory, and/or other mechanisms of movement may be used. Gravity promoted through a downward angle of the chute 110 is preferably used. The force of gravity may provide a transverse force vector towards the exit when the chute 110 is angled at a non-perpendicular angle relative to gravity. The relative angle of the vibrational system to the length of the chute 110 may similarly provide a transverse force on the grinds. The relative angle can alter the balance between the progression force vector and an agitation force vector. The relative angle may similarly be used to halt or even move grinds backwards along the chute 110.

Figure 6:
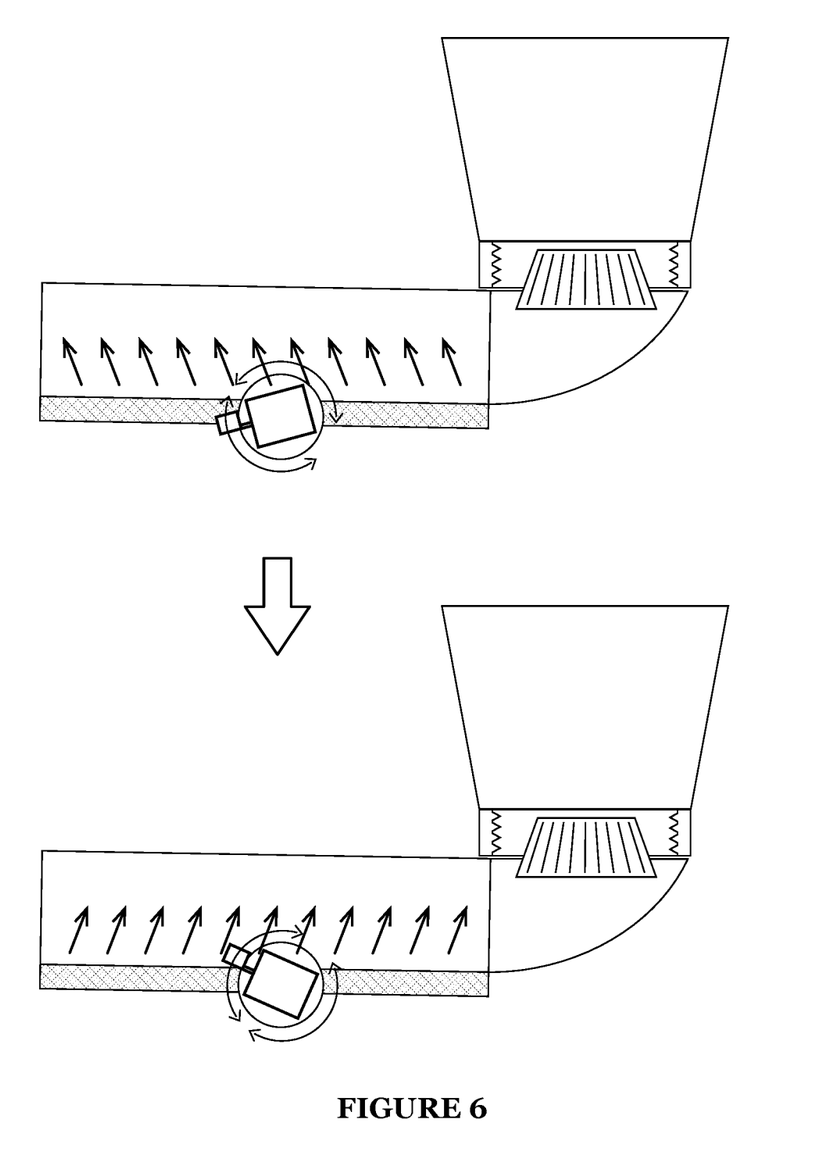
FIG. 6 is a schematic representation of an adjustable vibration system.

As shown in FIGS. 1 and 2, an angled vibrator motor may be statically fixed. As shown in FIG. 6, a vibrator motor may be dynamically angled. Dynamic angling can use a manual mechanism, where a user sets the motor angle by turning a dial. In this variation, different grinding settings may be obtained by setting different variables such as the vibrator motor angle which can alter the time grinds spend in the chute 110. In another variation, the dynamic angling may be automatically controlled through an actuator such as a stepper motor or other suitable mechanism. An automatically rotated vibrator motor could enable the progression of grinds to be dynamically changed during the refining process.

In an alternative embodiment, the vibration system 130 can be a passive vibration system 130 that induces vibrations of the filter system 120 through the grinder motor or another mechanism. In this variation, vibration caused by other processes of the grinder or coffee brewer provides the desired agitation. The bean grinder is preferably mechanically coupled to the filter system 120 and/or chute 110 in a configuration that transfers vibration and thereby act as the vibration system.

Figure 7:
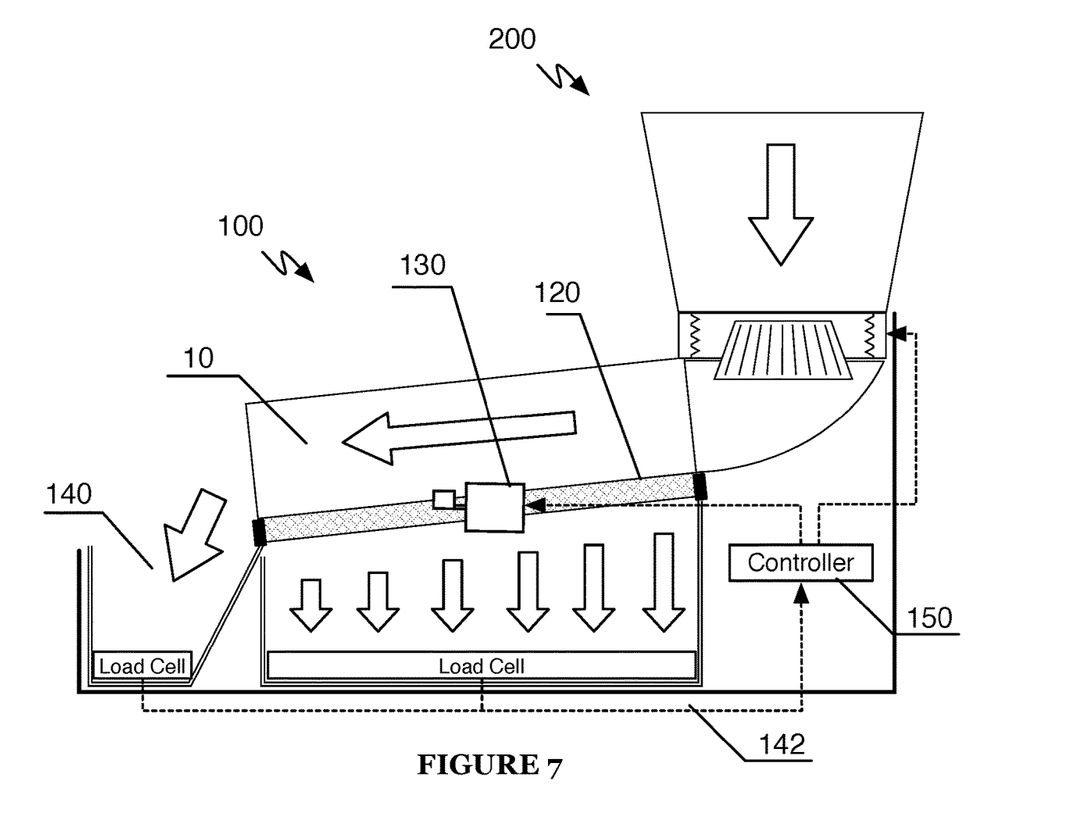
FIG. 7 is a schematic representation of a system with an agitation control system.

The system may additionally include an agitation control system 150 that functions to dynamically modulate and/or control a vibration system 130 as shown in FIG. 7. The amplitude and/or angle of agitation generated by the vibration system 130 may be controlled by the agitation control system 150.

In a variation with variable agitation angle, an operating mode of the agitation control system 150 can be set such that the grinds can be directed along the chute 110 by modulating the variable agitation angle of the vibrating system. The direction and the speed of progression of grinds may be augmented based on the agitation angle. Augmenting the progression of the grinds can be used in altering the filtering duration for grinds in the chute 110. The agitation angle is preferably used to progress the grinds toward the outlet but may alternatively be set to keep grinds substantially static in their progression through the chute (e.g., bouncing up and down in the same location in the chute) and/or to move upward in the chute 110. In one implementation, the vibration can have a bias in an upward-forward direction towards the grind outlet of the chute 110. The progression speed can be altered in part based on the angle. For example, in one operating mode, the agitation control system 150 may set the vibration to promote stagnant vibration where the grinds are substantially kept in the same location along the chute 110 while being vibrated up and down. The intensity of vibration can be another variable that may be used in combination with the controlled agitation angle.

The agitation angle can be modulated by adjusting the angle of the vibration system 130, but the agitation angle may alternatively be modulated by adjusting the slope of the filter system 120. In one implementation, the agitation control system 150 may control a slope actuator to adjust the angle of the filter system 120. The slope actuator preferably imparts some control over the angle of the filter system 120. This control may enable a set of discrete, steady state slope angles. This control may alternatively enable a range of slope angles within some range. In one implementation, the slope actuator is a rotational actuator that can rotate the chute 110 and/or filter system 120. In another implementation, the slope actuator can be a linear actuator that lifts or lowers one or both of the inlet and/or outlet of the chute thereby imparting a change in the slope of the filter system 120. In altering the slope, the impact of gravity and/or the agitation angle applied to the grinds can be modified. This can alter the progression of the grinds. Altering the progression of the grinds can similarly alter the filtering duration.

The agitation control system 150 may additionally or alternatively augment the intensity and/or magnitude of agitation. The agitation magnitude can be changed in discrete increments. In other variations, the agitation magnitude can be altered in accordance with a time-based signal.

The agitation control system 150 in one variation can be used in applying a static (e.g., closed-lope) agitation sequence. A static agitation sequence can be a single sequence pattern for modulating the agitation. The static agitation sequence may additionally be repeated. The static agitation sequence may not be variable based on some input. Various static agitation sequences may be used for different scenarios.

The agitation control system 150 in another variation could be dynamic agitation sequence that is adjusted based on at least one input. The dynamic agitation sequence may be determined from some variable input specified prior to starting agitation. For example, a desired processing time may be set and used to set the agitation sequence to be used for this instance of use. Alternatively, the dynamic agitation sequence can be responsive to one or more inputs detected during agitation such that agitation can be modulated in substantially real-time. For example, the quantity of refined grinds can be compared to the quantity of filtered grinds and used in modulating the progression of grinds to target a desired refined-to-filtered ratio.

The agitation control system 150 or an alternative control system may similarly be used for controlling other dynamic operating elements of the system. Other dynamic operating elements can include the grinding system 200 and/or the coffee brewing system 300. In particular, the grind system 200 may be controlled in coordination with the grind processing. For example, a grinding system 200 can be configured to dispense unprocessed grinds to the bean grind inlet, and a control system can coordinate activation of the grinding system 200 in targeting a produced bean quantity. Such a variation can include a scale used in measuring the grind quantity in one or more chamber and/or the output of the grinding system 200.

The system preferably includes a refined grind chamber 140 and a filtered grind chamber 142, which function as receptacles for different grind outputs of the system. The refined grind receptacle is preferably at the end of the chute 110. The refined grind chamber 140 preferably receives the refined grinds to be used in brewing coffee. In one variation, the refined grind receptacle is a brewing system where the refined grinds can be directly used to produce coffee. Alternatively, the refined grind receptacle holds the grinds, which can be manually used with an outside brewing system. The filtered grinds chamber 142 is preferably below the filter. Grinds that pass through the filter preferably fall into the filtered grind receptacle.

The system may additionally include a set of user interface elements, which may be used to control variable aspects of the grind refinement process. The user interface elements could be digital and/or manual controls. The user interface elements may expose manual control over various variables of the system. Variables of the system can include parameters such as initial grind size, filter size, chute 110 angle, and/or vibration angle. A user could manually adjust the settings for different results. Additionally or alternatively, the user interface elements may expose controls for setting different operating modes. The different operating modes may enable automatic control in response to some setting. The operating modes may offer different preset grind processes. For example, pre-set static processing routines may be selectable for cold brew, drip, espresso, and/or other types coffee grinds. The operating modes may alternatively enable modes for targeting a refined grind quality, processing time, grind waste limits, and/or other properties of processing grinds. In some variations, the system may be a fixed system that provides a single refinement process.

In one variation, the system can include a cleaning system. The cleaning system can be used to clean the filter system 120. The cleaning system may include a liquid rinsing system. The liquid rinsing system can dispense water through at least the filter system 120. The liquid rinsing system may automatically run at various instances, but may alternatively be a manually selectable option. In another variation, the vibration system 130 can offer a cleaning mode such that a filter system 120 can be cleaned through agitation. Alternatively, the system or parts of the system may be cleaned manually.

In one variation, the system can include grind-sensing elements. One grind-sensing element can be a grind measurement system which functions to measure the amount of refined grinds produced. In one variation, a load cell or scale on the refined grind chamber 140 can measure the deposited grinds. A load cell or scale or other suitable form of a grind measurement system could additionally measure grind quantities of other grind chambers. In one implementation, the system can include a scale integrated into the refined grind chamber and a control system configured to control processing of grinds so as to target producing a bean quantity as indicated by the scale. For example, the system can be directed to stop the grinding and/or refinement process when a desired amount or ratio of refined and/or filtered grinds is achieved. The quantity of grinds being processed could additionally be measured. A grind measurement system could additionally be used with the grinding system 200 or chute 110 to monitor the amount of grinds added for processing. In another variation, a load cell or other grind measurement system can be integrated into the vibration refinement system (e.g., the chute 110 and/or the filtered grind receptacle) and/or the grinder. The quantity of grinds being processed could additionally be measured. A grind measurement system could additionally be used with the grinding system 200 or chute 110 to monitor the amount of grinds added for processing. A vision system could be used in place of a load cell in measuring characteristics of the grind.

3. Method for Automated Coffee Grind Refinement

Figure 8:
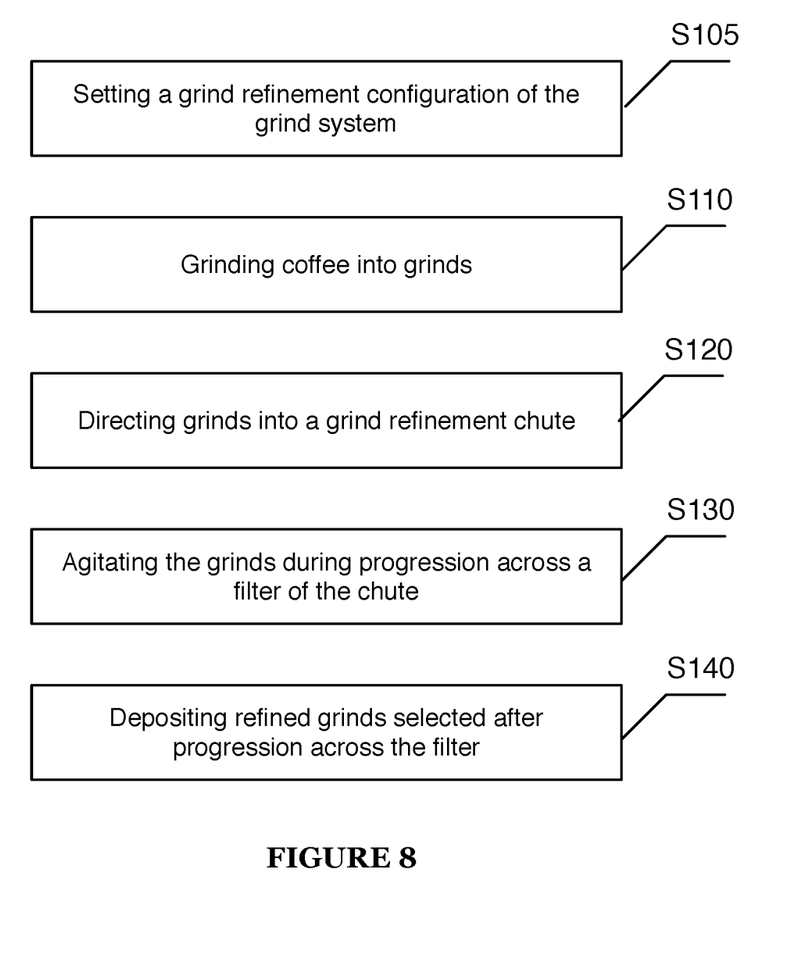
FIG. 8 is a flowchart representation of a method of a preferred embodiment.

As shown in FIG. 8, a method for automated coffee grind refinement of a preferred embodiment comprises grinding coffee into grinds S110; directing grinds into a grind refinement chute S120; agitating the grinds during progression across a filter of the chute S130; and depositing refined grinds selected after progression across the filter S140. The method is preferably implemented by a system substantially similar to the one described above, but the method may alternatively be implemented by any suitable system.

The method may include setting a grind refinement configuration of the grind system S105. In some variations, various aspects of the refinement process may be manually or automatically controlled. Variables of the refinement process can include filter size, refinement duration (which may be adjusted by changing the distance of the refinement chute or by altering the time spent in the refinement chute), adjusting the initial grind size, setting a desired grind size profile result, setting a grind waste threshold, setting a resulting grind quantity, and/or other suitable variables. Setting the filter size can include providing a replaceable filter. A filter could be manually or automatically changed between different settings. The refinement duration is preferably controllable by altering the angle and/or vibration direction of the refinement chute. The grind size may be altered by changing the grinding system. In some instances, multiple refinement variables are related and setting of one variable can alter a second variable. The settings can be manually set before use. The settings may alternatively be electronically set from a control panel. For example, a user may enter the grind size settings, and the system can adjust the variables to target that grind size.

Setting a desired grind size profile functions to specify the quality of the resulting grinds. Quality may be at least partially determined by grind size consistency. Setting the desired grind size profile may involve setting the grind size range or distribution. A higher quality grind will have a higher concentration of grinds within a small grind size. A low quality grind may have a lower concentration of grinds sized across a larger range of grind sizes.

Setting a grind waste threshold can function to limit the amount of grinds that are filtered out. In some instances, grinds that are filtered out will be wasted, as they are not intended for use. A grind waste threshold may be used in limiting the amount of grinds wasted. A grind waste threshold can be a percentage of grinds (e.g., no more than 30% of the grinds filtered from source) or a fixed quantity (e.g., no more than twenty grams of coffee wasted). Grind waste may be measured within a suitable time window such as a single grind processing instance, a day, a month, a year, etc. For example, a user could set that they do not want to waste.

Setting a resulting grind quantity functions to produce a certain quantity of grinds. Coffee grinds are preferably ground shortly before brewing, which may sometimes mean that a user will want to produce an exact quantity of grinds for an instance of use. For example, a user could indicate that they want to produce 50 grams of refined grinds.

Block S110, which includes grinding coffee into grinds, functions to produce the initial coffee grinds to be refined. The grinding of coffee is preferably performed with a coffee grinder which is preferably a burr grinder but may alternatively be ground using a blade grinder or other mechanism. The grinding process may be controlled so as to control the rate that grounds are deposited into the grind refinement chute and/or to control the quantity of grounds deposited into the grind refinement chute.

Alternatively, the method may include receiving outside coffee grinds. The received coffee grinds are preferably received in a holding vessel. The grinds can naturally fall into the grind refinement chute but may alternatively be deposited into the grind refinement chute through a controller mechanism, which functions to space out the grinds during refinement. For example, an outlet of the holding vessel may open and close to add grinds to be refined.

Block S120, which includes directing grinds into a grind refinement chute, functions to channel a source of coffee grinds into a system for refinement. The directed grinds preferably enter the refinement chute at one location (i.e., a grind inlet) and then travel through the refinement system until being produced out of an outlet of the grind refinement chute. In one variation, any received grinds may be enabled to freely enter the grind refinement chute. In another variation, a grind intake mechanism can be used in regulating the flow of coffee grinds into the grind refinement chute. For example, a valve door can be opened and closed to incrementally add grinds into the grind refinement chute. In another implementation, the valve door can vary the size of an opening to regulate the flow rate of grinds into the grind refinement chute.

Block S130, which includes agitating the grinds during progression across a filter of the chute, functions to vibrate or otherwise move the grinds during progression through the refinement chute. The vibrating of the grinds is preferably over a filtered region of the refinement chute. Grinds of a particular grind profile are preferably selectively filtered through the filter. During agitation, individual grinds with size profiles that correspond to the filter through-holes may be filtered out of the grinds. In other words, some grinds will fall through a filter element so that grinds are separated into at least two groups. The vibration is preferably achieved by driving one or more agitation mechanisms such as a vibrating motor, a solenoid, driving a linkage mechanism, and/or any suitable mechanism used to induce agitation.

The vibration can be directed to promote a desired profile of grind-filter contact. The exposure of the grinds to the vibration and/or filtering process can be configured and optionally controlled through augmenting the slope angle, agitation angle, agitation magnitude, and/or duration of agitation. Controlling the vibration and/or filtering process can be used to target one or more properties of grind output. Some exemplary properties that can be targeted can include the refined grind quantity, the filtered/wasted grind quantity, the refinement-to-waste ratio, the processing duration, and/or other properties. Controlling the vibration and/or filtering process can similarly be set to account for other factors of automated refinement such as grind affects (e.g., grind temperature, grind abrasion, etc.). Augmenting grind intake/delivery (e.g., activation of a grinding system or dynamic opening of a grind hopper) may also be used in targeting the above properties of the grind output in addition to or as an alternative to augmenting the agitation, In a controlled variation, block S130 preferably includes dynamically controlling progression of the grinds across the filter of the chute as a form of augmenting agitation. Dynamically controlling progression can include altering the angle of the chute. A chute, more specifically the filter element, could be angled at an incline, flat, or decline to adjust the direction and/or rate of grind progress through the chute. Dynamically controlling progression can additionally or alternatively include altering the angle of the agitation mechanism. The agitation mechanism is preferably a vibrating motor but could alternatively be any suitable mechanism used to induce movement and agitation of the grinds. The angle of the agitation mechanism is preferably changed relative to the floor of the chute such that vibration can bounce the grinds forward along the chute, in a substantially stationary vibration (e.g., up and down), and/or backwards away from the exit.

As mentioned, the processing of grinds may additionally include augmenting the processing duration of grinds. This preferably includes modeling the time duration for grinds to progress through the processing chute and augmenting the processing of grinds to. As the method may include dynamic processing, this modeling may be a distributed modeling across grinds at different points in the process. The duration of processing can impact how fully the grinds are filtered as well as introduction of negative effects such as grind heating and friction-based breakdown.

Augmenting the grind intake can include ending the intake of grinds, initiating the intake of grinds (e.g., to add more grinds), and/or modifying the rate of intake. When used with a grind hopper, a controllable valve may be set to different states to add more grinds, modify the rate that grinds flow into the refinement chute, and/or stop adding grinds. When used with a grinding system, the grinding system can be activated, deactivated, and/or have the output rate changed.

Targeting a refined grind quantity, wasted grind quantity, and/or refinement-to-waste ratio preferably includes measuring a grind quantity and then augmenting agitation and/or grind intake. This is preferably used to alter the quantity and rate at which grinds are received and/or to alter how the grinds are refined. The various goals may be targeted separately or in combination. For example, the method may include targeting a specified quantity of refined grinds without exceeding a quantity of wasted grinds.

Targeting a refined grind quantity will preferably may include measuring the mass or weight of grinds in a refined grind chamber, comparing the grind quantity to a target quantity, and then augmenting the intake of grinds and/or processing of the grinds. In one variation, this may include adjusting the amount of grinds received for processing to produce more refined grinds or to limit the amount of refined grinds. Alternatively, the refinement duration may be adjusted to produce more or less refined grinds as a compromise for grind consistency.

Targeting a wasted grind quantity will preferably include measuring the quantity of grinds in the chambers for undesired grinds. The wasted grind quantity threshold is preferably used as an upper threshold wherein the method targets producing no more than the wasted grind quantity threshold. The wasted grinds will generally be the filtered grinds, though in some variations, the refined grinds will be the filtered grinds. Wasted grinds may alternatively be described as the secondary grinds, which can be used for an alternative purpose.

Targeting a refinement-to-waste ratio will preferably include measuring the refined grinds and the wasted grinds and comparing the quantity of refined grinds and the quantity of wasted grinds. The refinement duration can be adjusted to modify this ratio in response.

As would be obvious to one skilled in the art, measuring the quantity of any one collection of grinds may similarly be achieved by measuring the quantities of the other parts in calculating the quantity of a collection without direct measurement. For example, measuring the quantity of refined grinds can be achieved by measuring the quantity of processed grinds (e.g., the input) and subtracting the measurement of filtered grinds.

Targeting a processing duration can be achieved by augmenting the agitation process. In one variation, the downward slope may be increased such that grinds more quickly move through the refinement chute or the slope may be decreased to slow progress of the grinds. In another variation, duration may be altered by adjusting the agitation angle imparted on grinds in the refinement chute. The agitation angle can be used to increase, decrease or halt the rate of progression.

Block S140, which includes depositing refined grinds selected after progression across the filter, functions to produce a refined set of grinds. The undesired smaller grinds are preferably filtered out of the initial set of grinds, leaving the refined grinds within the refinement chute. The refined grinds fall out of the chute and can be held in a vessel for later use. The refined grinds may alternatively be directly deposited into a brewing mechanism. The filtered grinds can similarly be caught in a vessel. The filtered grinds may be thrown away as waste, but may alternatively be used in other coffee drink applications or used in alternative ways. In some instances, the filtered grinds can constitute a second set of refined grinds but of a second, distinct size profile. Similarly, in some variations, the filtered grinds may be the desired refined grinds and the grinds deposited out the exit of the chute may be considered the waste grinds or secondary grinds.

As a person skilled in the art will recognize from the previous detailed description and from the figures and claims, modifications and changes can be made to the embodiments of the invention without departing from the scope of this invention as defined in the following claims.

We claim:

1. A coffee bean grind filtering system comprising:
a bean refinement chute with a bean grind inlet through which bean grinds are received and a refined grind outlet;
a filter system integrated into at least one surface within the bean refinement chute and wherein the filter system filters the bean grinds into at least refined grinds and filtered grinds, wherein the refined grinds are bean grinds that progress across the filter system from the bean grind inlet to the refined grind outlet, and wherein the filtered grinds are the bean grinds that pass through the filter system;
a vibration system operable in an active state that agitates bean grinds during progression from the bean grind inlet to the refined grind outlet;
a refined grind chamber positioned adjacent to the refined grind outlet and thereby collects refined grinds;
a filtered grind chamber positioned beneath the filter system and thereby collects filtered grinds that pass through the filter system;
a grind measurement system integrated into the refined grind chamber; and
a control system configured to control filtering of the bean grinds in targeting a produced refined bean quantity as indicated by the grind measurement system.

2. The system of claim 1, wherein the chute is an enclosed linear channel with the filter system exposed along at least the bottom surface; wherein the filter system has a downward surface slope from the bean grind inlet to the refined grind outlet.

3. The system of claim 2, the filter system is flexibly mounted within the coffee bean processing system.

4. The system of claim 3, wherein the vibration system comprises a vibrational motor coupled to the flexibly mounted filter system.

5. The system of claim 1, further comprising a bean grinder configured to dispense unprocessed grinds to the bean grind inlet; and wherein the bean grinder is mechanically coupled to the filter system in a configuration that transfers vibration and thereby act as the vibration system.

6. The system of claim 1, wherein the filter system comprises a filter chamber; and a filter cartridge that can removably engage with the filter chamber.

7. The system of claim 1, wherein the filter system comprises at least two filter stages with a first filter stage with a first mesh filter size and a second filter stage with a second mesh filter size.

8. The system of claim 7, wherein the second filter stage is sequentially positioned after the first filter stage; and wherein the filtered grind chamber is positioned beneath the first filter stage of the filter system; and further comprising a second filtered grind chamber positioned beneath the second filter stage.

9. The system of claim 1, further comprising an agitation control unit configured to dynamically modulate vibration.

10. The system of claim 9, wherein the vibration system has a variable agitation angle, and the agitation control unit modulates the variable agitation angle.

11. The system of claim 1, a slope actuator coupled to the filter system and configured to dynamically modulate slope of the filter system during agitation and thereby alter filtering duration.

12. The system of claim 1, further comprising a bean grinder configured to dispense unprocessed grinds to the bean grind inlet; wherein the control system coordinates activation of the bean grind in targeting the produced bean quantity.

13. The system of claim 1, wherein the chute is an enclosed linear channel with the filter system exposed along at least the bottom surface; wherein the filter system has a downward surface slope from the bean grind inlet to the refined grind outlet.

14. The system of claim 1, wherein the filter system comprises a filter chamber; and a filter cartridge that can removably engage with the filter chamber.

15. The system of claim 1, further comprising an agitation control unit configured to dynamically modulate vibration.

16. The system of claim 1, wherein the chute is an enclosed linear channel with the filter system exposed along at least the bottom surface; wherein the filter system has a downward surface slope from the bean grind inlet to the refined grind outlet.

17. The system of claim 1, wherein the filter system comprises a filter chamber; and a filter cartridge that can removably engage with the filter chamber.

18. The system of claim 1, further comprising an agitation control unit configured to dynamically modulate vibration.

19. A coffee bean grind filtering system comprising:
a bean refinement chute with a bean grind inlet through which bean grinds are received and a refined grind outlet;
a bean grinder configured to dispense bean grinds into the bean grind inlet;
a filter system integrated into at least one surface within the bean refinement chute and wherein the filter system filters the bean grinds into at least refined grinds and filtered grinds, wherein the refined grinds are bean grinds that progress across the filter system from the bean grind inlet to the refined grind outlet, and wherein the filtered grinds are the bean grinds that pass through the filter system;
a vibration system operable in an active state that agitates bean grinds during progression from the bean grind inlet to the refined grind outlet, and wherein the bean grinder is mechanically coupled to the filter system in a configuration that transfers vibration and thereby act as the vibration system;
a refined grind chamber positioned adjacent to the refined grind outlet and thereby collects refined grinds;
a filtered grind chamber positioned beneath the filter system and thereby collects filtered grinds that pass through the filter system; and
a grind measurement system integrated into the refined grind chamber; and
a control system configured to control filtering of the bean grinds in targeting a produced refined bean quantity as indicated by the grind measurement system.

20. A coffee bean grind filtering system comprising:
a bean refinement chute with a bean grind inlet through which bean grinds are received and a refined grind outlet;

a filter system integrated into at least one surface within the bean refinement chute and wherein the filter system filters the bean grinds into at least refined grinds and filtered grinds, wherein the refined grinds are bean grinds that progress across the filter system from the bean grind inlet to the refined grind outlet and wherein the filtered grinds are the bean grinds that pass through the filter system;

wherein the filter system comprises a filter chamber;

a filter cartridge that can removably engage with the filter chamber;

a vibration system operable in an active state that agitates bean grinds during progression from the bean grind inlet to the refined grind outlet;

a refined grind chamber positioned adjacent to the refined grind outlet and thereby collects refined grinds; and a filtered grind chamber positioned beneath the filter system and thereby collects filtered grinds that pass through the filter system.

* * * * *